(12) United States Patent
Eriksson et al.

(10) Patent No.: US 8,392,078 B2
(45) Date of Patent: Mar. 5, 2013

(54) METHOD FOR ADJUSTMENT OF AN AUTOMATICALLY SELECTED GEAR SHIFTING ROTATIONAL SPEED LIMIT IN A VEHICLE

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 652 days.

(21) Appl. No.: 12/602,776

(22) PCT Filed: Jun. 8, 2007

(86) PCT No.: PCT/SE2007/000552
§ 371 (c)(1),
(2), (4) Date: Dec. 3, 2009

(87) PCT Pub. No.: WO2008/150201
PCT Pub. Date: Dec. 11, 2008

(65) Prior Publication Data
US 2010/0179737 A1     Jul. 15, 2010

(51) Int. Cl.
*G06F 7/00* (2006.01)

(52) U.S. Cl. ............... 701/55; 701/52; 701/58; 701/62; 477/165

(58) Field of Classification Search ............. 701/51–56, 701/58, 60, 62; 477/34, 111, 165
See application file for complete search history.

(56) References Cited

U.S. PATENT DOCUMENTS

| | | | | |
|---|---|---|---|---|
| 4,044,634 A * | 8/1977 | Florus et al. | 477/154 |
| 4,648,290 A * | 3/1987 | Dunkley et al. | 477/78 |
| 4,800,360 A * | 1/1989 | Dunkley et al. | 340/456 |
| 4,888,577 A * | 12/1989 | Dunkley et al. | 340/461 |
| 4,930,078 A * | 5/1990 | Dunkley et al. | 701/52 |
| 4,930,081 A * | 5/1990 | Dunkley et al. | 701/52 |
| 4,937,749 A * | 6/1990 | Dunkley et al. | 701/52 |
| 5,410,476 A * | 4/1995 | Iizuka | 701/56 |
| 5,564,999 A | 10/1996 | Bellinger et al. | |
| 5,655,991 A * | 8/1997 | Lardy et al. | 477/46 |
| 6,030,315 A * | 2/2000 | Bellinger | 477/121 |
| 6,085,137 A | 7/2000 | Aruga et al. | |
| 6,292,741 B1 * | 9/2001 | Bitzer et al. | 701/115 |
| 6,371,886 B1 * | 4/2002 | Sawa et al. | 477/115 |
| 6,658,339 B1 * | 12/2003 | Wright et al. | 701/53 |
| 7,029,421 B2 * | 4/2006 | Henneken et al. | 477/120 |
| 7,076,355 B2 * | 7/2006 | Ota et al. | 701/51 |

(Continued)

OTHER PUBLICATIONS

Heisler, H. Semi- and Fully Automatic Transmission, Advanced Vehicle Technology, 2002, pp. 117-192.*

(Continued)

*Primary Examiner* — Russell Frejd
(74) *Attorney, Agent, or Firm* — WRB-IP LLP

(57) ABSTRACT

A method is provided for adjustment of an automatically selected gear shifting rotational speed limit when an automatic step geared vehicle transmission is in an automatic gear shifting drive mode, and where the transmission includes a drive mode selector for selection of at least the automatic gear shifting drive mode and a neutral mode. The adjustment of the automatically selected gear shifting rotational speed limit is performed temporarily by a driver of the vehicle when the automatic gear shifting drive mode is selected. Driving flexibility in automatic drive mode increases.

16 Claims, 4 Drawing Sheets

U.S. PATENT DOCUMENTS

| | | | |
|---|---|---|---|
| 7,337,051 B2 * | 2/2008 | Ota et al. | 701/51 |
| 7,921,945 B2 * | 4/2011 | Harris | 180/65.285 |
| 8,078,369 B2 * | 12/2011 | Reith et al. | 701/51 |
| 8,200,402 B2 * | 6/2012 | Doebele et al. | 701/51 |
| 2002/0139212 A1 * | 10/2002 | DeJonge | 74/473.3 |
| 2003/0232680 A1 | 12/2003 | Matsunaga et al. | |
| 2008/0085815 A1 * | 4/2008 | Winkel et al. | 477/78 |

OTHER PUBLICATIONS

Shimazu et al, Directly Control Pneumatic Clutch for Heavy Duty Vehicles, IEEE, American Control Conference, 1986, pp. 252-257.*
International Search Report for corresponding International Application PCT/SE2007/000552.

* cited by examiner

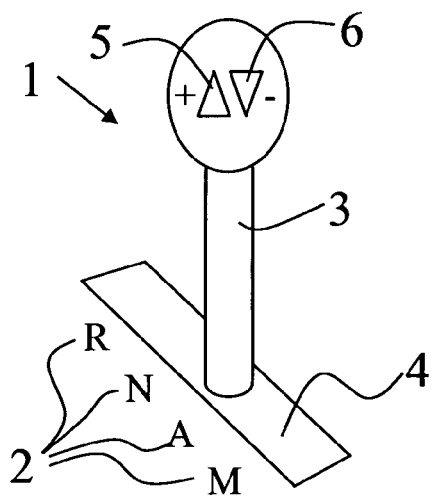
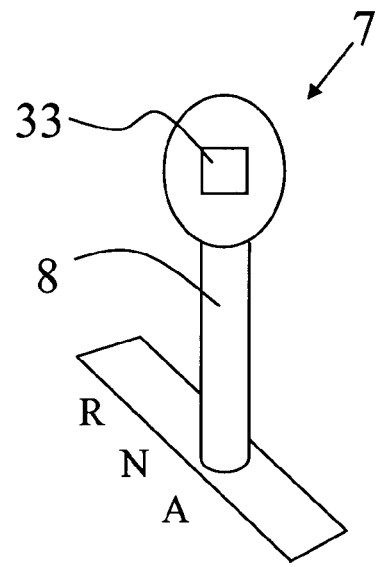
Fig. 1a
Fig. 1b
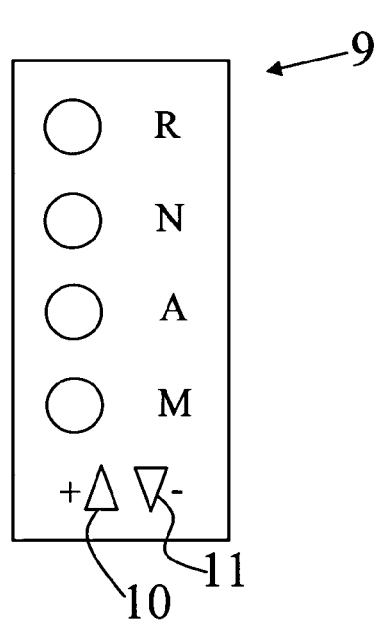
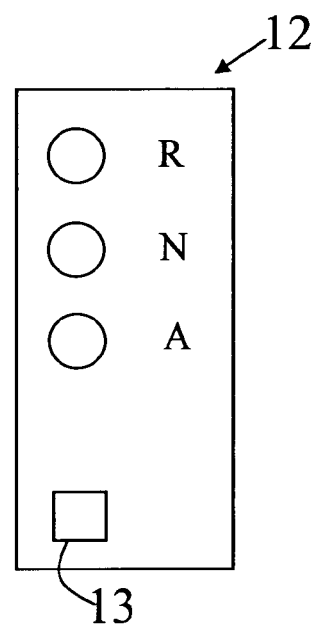
Fig. 1c
Fig. 1d

METHOD FOR ADJUSTMENT OF AN AUTOMATICALLY SELECTED GEAR SHIFTING ROTATIONAL SPEED LIMIT IN A VEHICLE

BACKGROUND AND SUMMARY

The present invention relates to a method for manually adjusting automatically selected gear shifting rotational speed limit when an automatic step geared vehicle transmission is in an automatic gear shifting drive mode.

The present invention also relates to a computer program and computer program product both to be used with a computer for executing said method.

Many modern automatic step geared transmissions used in medium and heavy duty truck applications include a so-called "hold mode" or "manual mode" feature that allows the vehicle operator to effectively lock the automatic transmission in any desired gear, and which in the manual mode case further includes the capability to permit manual upshifts and downshifts during manual mode operation. The hold or manual mode feature is intended, at least in part, to provide added flexibility and driver control of the vehicle under low vehicle speed and high engine load conditions by allowing the driver to override transmission shift point logic. Examples of vehicle operating conditions wherein such hold or manual mode operation is beneficial include, but are not limited to, maneuvering away from loading docks, traversing intersections, climbing positive grades, operating in extreme terrains, and the like.

It is desirable to add more flexibility to the driver when driving a vehicle with an automatic step geared transmission.

The method according to an aspect of the invention is a method for adding more flexibility to the driver when driving a vehicle with an automatic step geared transmission.

The method is a method for adjustment of an automatically selected gear shifting rotational speed limit when an automatic step geared vehicle transmission is in an automatic gear shifting drive mode. Said transmission comprises (includes, but is not necessarily limited to) a drive mode selector, for selection of at least said automatic gear shifting drive mode and a neutral mode. The method is characterized in that adjustment of the automatically selected gear shifting rotational speed limit is performed temporarily by a driver of the vehicle when said automatic gear shifting drive mode is selected.

The advantage with the method according to an aspect of the invention is that driving flexibility increases. It will be easier for the driver to temporarily override the automatic drive mode in order to better optimize a drive. There is no need to change to a manual or hold mode in order to temporarily manually control the transmission.

According to one embodiment of the method according to an aspect of the invention the driver adjusts an automatically selected gear shifting rotational speed limit for an upshift and/or an automatically selected gear shifting rotational speed limit for a down shift.

According to one further embodiment of the method according to an aspect of the invention the driver performs the adjustment via at least an adjustment control. There can be a first adjustment control used for said upshift limit and a second adjustment control used for said down shift limit. In a further embodiment said first and second adjustment controls are also controls for manual gear selection, which manual gear selection function is active only when a manual drive mode is selected with said drive mode selector.

According to one further embodiment of the method according to an aspect of the invention said adjustment is performed by the driver giving input to said adjustment control step wise. Each step then corresponds to a predetermined adjustment interval of the automatically selected gear shifting rotational speed limit.

According to one further embodiment of the method according to an aspect of the invention said adjustment is performed as long as the driver is giving input to said adjustment control, so that a coming gear shift is postponed at least as long as the driver is giving the input to said adjustment control.

In a further embodiment of an aspect of the invention said gear shifting mode selector is a gear shift lever.

In a further embodiment of an aspect of the invention said adjustment control is at least a button arranged on said gear shift lever.

According to one further embodiment of the method according to an aspect of the invention said adjustment is started first after the driver has given input to said adjustment control during a predetermined time. In a development of this embodiment said adjustment, when activated, is a gear shift adjustment in one first direction, which adjustment will be continued until inactivation by a gear shift command in an opposite direction to said first direction.

BRIEF DESCRIPTION OF THE DRAWING

The present invention will be described in greater detail below with reference to the accompanying drawing which, for the purpose of exemplification, shows further preferred embodiments of the invention and also the technical background, and in which:

FIGS. 1a to 1f diagrammatically show different embodiments of adjustment control according to the invention.

DETAILED DESCRIPTION

Figure 1E:
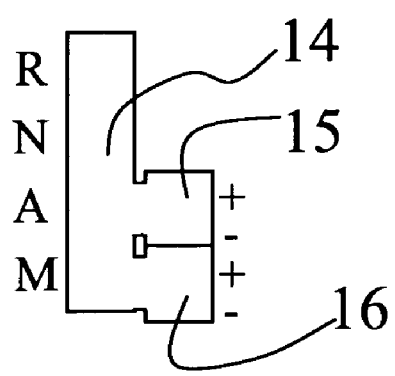

In such commercial vehicles as heavy trucks and buses, it is common to have computer controlled subsystems. Among others, those subsystems typically include at least an engine and a transmission. With the introduction of computer based control systems for the engine and the transmission, and the capability for the exchange of information therebetween, it is now possible to automate coordination between the two subsystems for such benefits as fuel economy and acceleration, as well as driver comfort and drivability. Using such computer-based control systems, driver fatigue can be substantially reduced, as well as facilitate a less experienced operator's near expert control of the vehicle. In below shown embodiments the invention can be applied in a transmission comprising a clutch and a gearbox.

In FIG. 1a a transmission control 1 that enables the driver to select an appropriate drive mode 2 including, but not limited to, automatic A, manual M, neutral N and reverse R is shown. Said transmission control 1 comprises a gear shift lever 3 arranged in a slot 4 and movable between different positions in the slot, said position representing said different drive modes. The position of the lever is communicated to a transmission control unit for driver input to said transmission control unit controls, which input forms the basis for control of the transmission and engine especially during gear shifting.

The manual mode M enables the driver to make a manual gear selection through a control device for manual gear selection, which in the embodiment showed in FIG. 1a is realized as a plus and a minus push button 5 and 6 arranged on the knob or upper end of the gear shift lever 3 for selecting upshifts and downshifts respectively. Said push buttons 5 and 6 can also be realized as a toggle switch (not shown) with a plus and minus end. The control device could also be in the form of a scroll (not shown). The control device could also be a lever (not shown) or joystick (not shown) arranged somewhere near the driver, e.g. by the steering wheel, by the gear shift lever or by a driver's seat.

Figure 2:
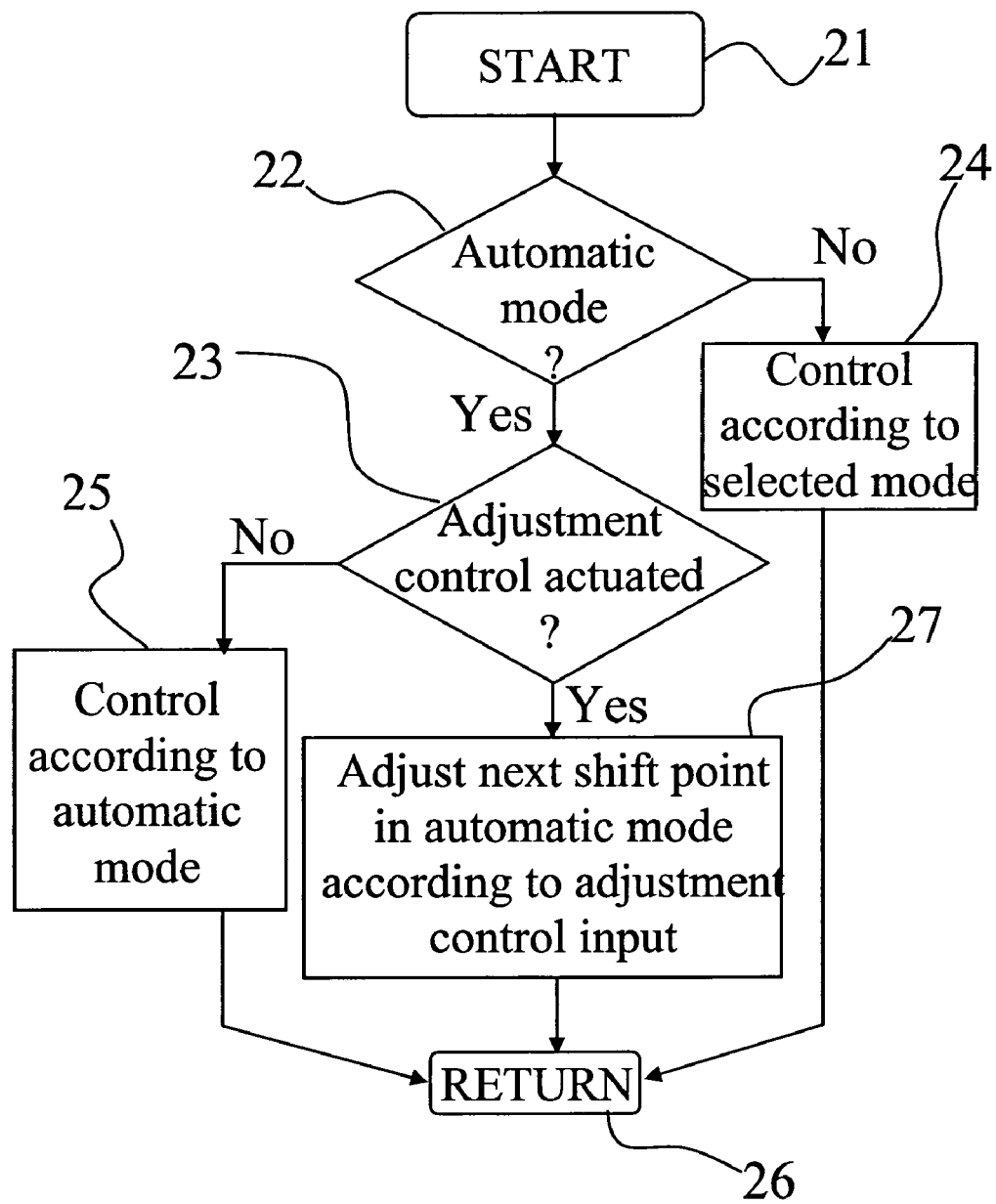
FIG. 2 shows a flowchart of one embodiment of the invention.

When the driver selects automatic mode A the transmission unit automatically selects and engages gears according to a preprogrammed gear selection strategy. According to a preferred embodiment of the invention said transmission control unit is programmed to register input from the driver through said push buttons 5 and 6 during engaged automatic mode A. FIG. 2 shows a flowchart illustrating the programmed steps according to the invention. The inventive sequence starts in step 21. In step 22 the transmission unit is according to the invention programmed to register if automatic mode A is selected by the driver or not. If No then, according to step 24, normal transmission control is performed by the transmission control unit and according to driver selected drive mode. After this step the sequence goes to Return 26. If there is a Yes in step 22 then the transmission control unit is programmed to check in step 23 if the driver has given input through an adjustment control. In the embodiment shown in FIG. 1a said push buttons 5 and 6 are programmed to be the adjustment control. If there is no actuation of the adjustment control, i.e. there is a No in step 23, then the transmission control unit is programmed to control the transmission according to the preprogrammed gear selection strategy of the automatic mode as indicated in step 25. After step 25 the sequence goes to Return 26. If there is an actuation of the adjustment control by the driver, i.e. if there is a Yes in step 23 then, then according to the invention, the transmission control unit is in step 27 programmed to adjust the preprogrammed transmission control strategy according to driver input through the adjustment control.

Figure 1F:
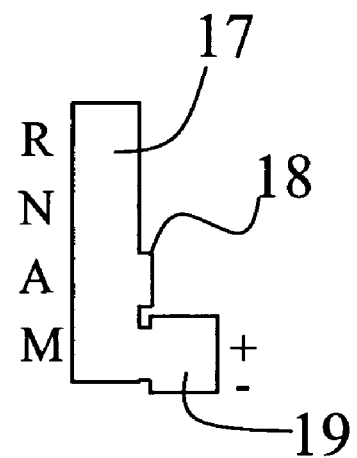

Thus, when the driver pushes the plus button 5 or minus button (in automatic mode the transmission control unit is according to one embodiment of the invention programmed to wait with any planned upshift and downshift until the driver releases the pressed push button. By pushing the minus button the upshifting rpm limit will be displaced to a higher rpm and by pushing the plus button the down shifting rpm limit will be displaced to a lower rpm. This is valuable for example when the vehicle is closing up to an upslope and the driver wants to increase vehicle speed without an unwanted automatic upshift. This is also valuable when the vehicle is closing up to a top of a hill and the driver wants to avoid a possible automatic downshift. FIGS. 1b to 1f alternative embodiments of the adjustment control, which can be used as driver input interface for adjusting the preprogrammed gear shifting, strategy in the automatic mode. FIG. 1b shows a transmission control 7 without a manual mode. As shown this embodiment comprises drive modes reverse R, neutral N and automatic A. When the gear shift lever 8 is in automatic mode A the driver can adjust the preprogrammed gear shifting strategy by pressing the single push button 33. Thus, a planned upshift and downshift can be postponed until the driver releases the pressed push button 33. Also here alternatives to a push button can be used. In FIG. 1c another embodiment of a transmission control 9 is disclosed. In function embodiment has the same driver interface as the embodiment showed in FIG. 1a. The only difference is that the gear shift lever has been changed into a keypad comprising push buttons for the different drive modes R, N, A and M. The keypad includes also buttons 10 and 11 for the combined adjustment control and up-/down-shift control. FIG. 1d shows a transmission control 12 with corresponding driver interface as in the embodiment shown in FIG. 1b, but with a keypad for the drive modes R, N and A and also a button 13 for the adjustment control. FIG. 1e shows an alternative embodiment of the gear shift lever slot in FIG. 1a, but with basically the same function in the embodiment of FIG. 1c the main slot 14 has been extended with two different side slots 15 and 16. Each extended slot is positioned at a side of the positions for automatic mode A and manual mode M so that the gear shift lever when in automatic mode can be moved in a direction perpendicular to the directions the lever is moved when shifting between the chive modes. When the gear shift lever is in one of said side slots, the gear shift lever can be moved from a center position into two directions opposite from each other and in parallel with the direction the lever is moved when shifting between the drive modes. The ends of the two opposite directions indicate respectively upshift/downshift (+/−) when the gear shift lever is in the extended slot for manual drive mode. When the gear shift lever is in the corresponding extended slot 15 of the automatic drive mode then the two corresponding opposite directions (+/−) indicate adjustment of an upshift or downshift rotational speed limit with the same inventive function as the embodiment of FIG. 1a. FIG. 1f shows an alternative embodiment of a gear shift slot 17 with side slots 18 and 19. Here, the side slot 19 for the manual drive mode M is the same and has the same function as in the embodiment of FIG. 1e. The side slot for the automatic mode is different from the embodiment of FIG. 1e. When the gear shift lever is in the automatic position in the embodiment of FIG. 1f, the gear shift lever can be moved only in one direction from slot 17 and perpendicular to the directions the lever is moved when shifting between the drive modes. Thus an adjustment function for the automatic drive mode as in the embodiment of FIG. 1b or 1d can be achieved. The embodiment of FIG. 1f could be provided with a second side slot, same as the above mentioned slot 18 but inverted in a second direction at a side from the automatic mode position in slot 17. An embodiment of the invention with the same function as in the embodiment of FIG. 1f can be achieved with a gear shift lever as well. The function of the slots 18 and 19 can be moved to, for example, buttons arrange preferably at the top of a gear shift lever. There can be one first button for upshift and one second for downshift both used for the manual drive mode, and a third button used as an adjustment control in the automatic drive mode.

According to another embodiment of the invention a more selective gear shift adjustment can be obtained in the automatic mode by the transmission control unit being programmed to postpone only upshifts as long as the driver presses the minus button. The transmission control unit can further be programmed to postpone a downshift as long as the plus button is pressed by the driver. This embodiment of the invention demands an adjustment control with a plus and a minus button, thus it could be implemented in all the embodiments described above with a plus and a minus input possibility when in the automatic mode. Note that down shifting should never be totally blocked in order to avoid killing the engine, thus if an extreme drivetrain condition occurs then the transmission control unit can be programmed to take over the control of the transmission.

In further embodiments of the embodiments presented above the adjustment of the down or up shifting rpm limits can be adjusted stepwise as a function of number of button pressings. The magnitude of the steps can be preprogrammed.

In a further embodiment of the invention the adjustment of the up or down shifting rpm limit can be activated first after the driver has pressed the adjustment control a certain predetermined time. This would relief the driver from pressing the adjustment control during longer time periods in order to postpone a gear shift (upshift or down shift). This feature would be useful, for example, when the driver wishes to accelerate the vehicle before the arrival to an uphill slope and in order to postpone (or even hinder) an upshift due to the vehicle speed increase the driver only has to press the adjustment control only for a limited predetermined amount of time. Later when the vehicle has entered the uphill slope and the vehicle speed will decrease, due to the gravitational force, down to a down shifting rpm limit, which follows the ordinary gear shifting strategy, said adjustment of the upshift will be inactivated in the same moment the downshift is initiated. This embodiment works in the corresponding way when a downshift rpm limit is adjusted.

In further embodiments of the embodiments mentioned above with only one button (or control with similar function) for adjusting gear shifting points, the transmission control unit can be programmed to register if the button is pressed during a rpm increase or decrease. If the button is pressed during a rpm increase the transmission control unit is programmed to adjust only the rpm upshifting limit (or temporarily inhibit upshifting). In a further embodiment of the invention this could be combined with the corresponding function for when the button is pressed during rpm decrease. If a rpm decrease is registered during the pressing of the button the transmission control unit is programmed to adjust only the rpm downshifting limit (or temporarily inhibit downshifting). This could also work with the embodiments having a plus and a minus adjustment control. In a further developed embodiment of the invention the transmission control unit can be programmed to sense if an rpm increase/decrease is higher than a predetermined limit. If the rpm increase/decrease is higher than said predetermined limit the transmission control unit can be programmed to inhibit adjustment of rpm shift limit in order to avoid sudden engine over speed or engine under speed.

Figure 3:
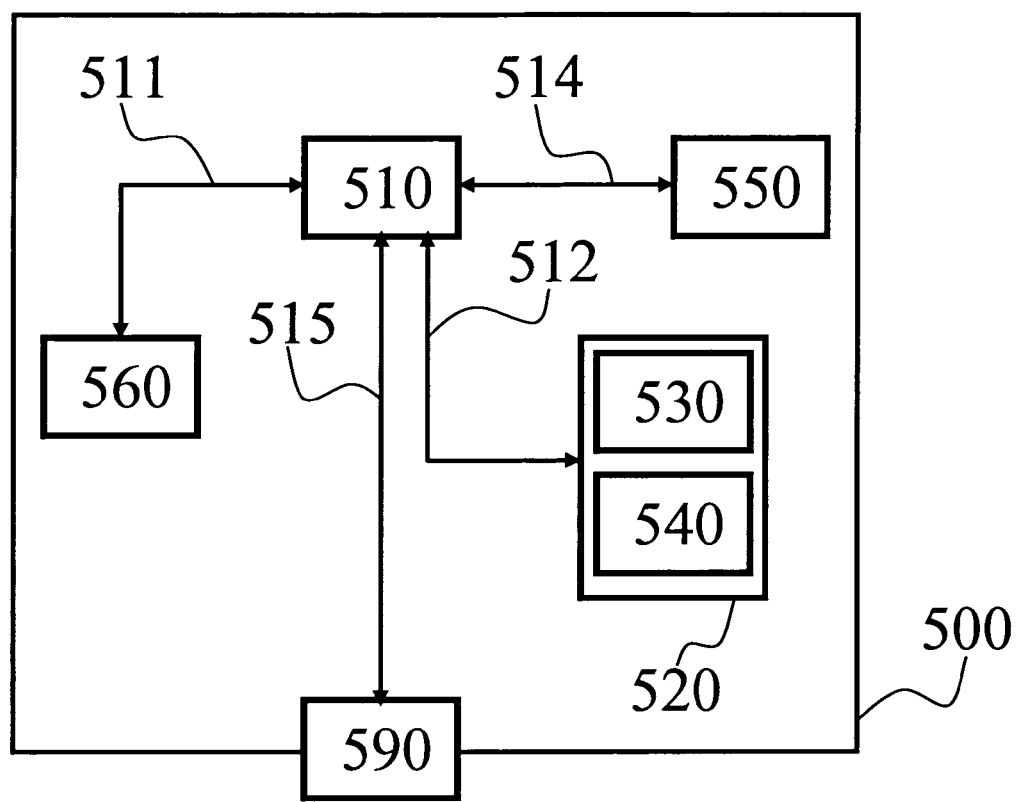
FIG. 3 shows the invention applied on a computer arrangement.

FIG. 3 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the transmission control unit mentioned above. The data-processing unit 510 can comprise, for example, a microcomputer.

The memory 520 also has a second memory part 540, in which a program for adjustment of an automatically selected gear shifting rotational speed limit when an automatic step geared vehicle transmission is in an automatic gear shifting mode function according to the invention is stored. In an alternative embodiment, the program for controlling the target gear selection function is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for adjustment of an automatically selected gear shifting rotational speed limit when an automatic step geared vehicle transmission is in an automatic gear shifting drive mode, and where the transmission comprises a drive mode selector, for selection of at least the automatic gear shifting drive mode and a neutral mode, the method comprising
performing adjustment of the automatically selected gear shifting rotational speed limit by a driver of the vehicle when the automatic gear shifting drive mode is selected.

2. A method as claimed in claim 1, wherein the driver adjusts an automatically selected gear shifting rotational speed limit for an upshift.

3. A method as claimed in claim 1, wherein the driver adjusts an automatically selected gear shifting rotational speed limit for a down shift.

4. A method as claimed in claim 1, wherein the driver performs the adjustment via at least an adjustment control.

5. A method as claimed in claim 2, wherein a first adjustment control is used for the upshift limit and a second adjustment control is used for the down shift limit.

6. A method as claimed in claim 5, wherein the first and second adjustment controls are also controls for manual gear selection, which manual gear selection function is active only when a manual drive mode is selected with the drive mode selector.

7. A method as claimed in claim 4, wherein the adjustment is performed by the driver giving input to the adjustment control step wise, where each step corresponds to a predetermined adjustment interval of the automatically selected gear shifting rotational speed limit.

8. A method as claimed in claim 4, wherein the adjustment is performed as long as the driver is giving input to the adjustment control, so that a coming gear shift is postponed at least as long as the driver is giving the input to the adjustment control.

9. A method as claimed in claim 1, wherein the gear shifting mode selector is a gear shift lever.

10. A method as in claim 4, wherein the adjustment control is at leas button arranged on the gear shift lever.

11. A method as claimed in claim 1, wherein the gear shifting mode selector is at least one button for selecting different gear shifting modes.

12. A method as claimed in claim 4, wherein the adjustment starts first after the driver has given input to the adjustment control during a predetermined time.

13. A method as claimed in claim 12, wherein the adjustment, when activated, is a gear shift adjustment in one first direction, which adjustment continues until it is inactivated by a gear shift command in an opposite direction to the first direction.

14. A non-transitory computer readable storage medium comprising a program code for executing the method as claimed in claim 1.

15. A computer comprising a program code for executing the method as claimed in claim 1.

16. A computer program product loaded into an internal memory in a computer, which computer program product comprises a computer program for executing the method as claimed in claim 1.

* * * * *